United States Patent [19]

Edelman

[11] 4,130,604

[45] Dec. 19, 1978

[54] PRODUCTION OF AN IMPROVED POLYOXYMETHYLENE MOLDING COMPOSITION WHICH FORMS REDUCED MOLD DEPOSITS UPON MOLDING

[75] Inventor: Robert Edelman, Staten Island, N.Y.

[73] Assignee: Celanese Corporation, New York, N.Y.

[21] Appl. No.: 846,662

[22] Filed: Oct. 28, 1977

Related U.S. Application Data

[63] Continuation-in-part of Ser. No. 751,849, Dec. 17, 1976, abandoned.

[51] Int. Cl.$^2$ .............................................. C08L 69/00
[52] U.S. Cl. .................................... 260/860; 528/481; 528/492
[58] Field of Search ................ 528/481, 492; 260/823, 260/860, 67 FP

[56] References Cited

U.S. PATENT DOCUMENTS

| 3,012,990 | 12/1961 | Kray et al. | 260/67 FP |
|---|---|---|---|
| 3,131,165 | 4/1964 | Hermann et al. | 260/67 FP |
| 3,290,261 | 12/1966 | Goldblum | 260/860 |
| 3,563,847 | 2/1971 | Rye et al. | 260/860 |
| 3,646,159 | 2/1972 | Miller | 260/860 |

Primary Examiner—Thomas De Benedictis, Sr.
Attorney, Agent, or Firm—Kenneth A. Genoni

[57] ABSTRACT

The mold deposit problem commonly associated with polyoxymethylene molding compositions which creates a non-uniform surface on a molded article effectively is minimized. The polyoxymethylene polymer initially is heated (as described) while in admixture with about 1 to about 4 percent by weight based upon the weight of the oxymethylene polymer of an aromatic polycarbonate (as defined). In a preferred embodiment a minor quantity of malonamide also is admixed with polyoxymethylene polymer and the aromatic polycarbonate during heating.

25 Claims, No Drawings

4,130,604

PRODUCTION OF AN IMPROVED POLYOXYMETHYLENE MOLDING COMPOSITION WHICH FORMS REDUCED MOLD DEPOSITS UPON MOLDING

CROSS REFERENCE TO RELATED APPLICATION

This is a continuation-in-part of U.S. Ser. No. 751,849, filed Dec. 17, 1976 and now abandoned.

BACKGROUND OF THE INVENTION

The present invention relates to a process for minimizing the mold deposit problem frequently encountered when polyoxymethylene molding compositions are molded. Such deposits are detrimental to the formation of a quality molded article having smooth and uniform surface characteristics.

As is well known polyoxymethylene or polyacetal, is a thermoplastic resin which finds wide utility in the manufacture of shaped articles by injection molding or extrustion processes. Polyoxymethylene has many excellent mechanical properties which result in shaped articles characterized by their hardness, strength and toughness.

Polyoxymethylene resin, however, is subject to degradation particularly under the influence of heat, the amount of degradation being a factor of the method of preparation of the polyoxymethylene and the like. The degradation may occur for example, as the result of oxidative attack. The oxidative attack, which may lead to chain scission and depolymerization, is often retarded by the addition of antioxidants to the polyoxymethylene composition. Degradation is also believed to occur as the result of acidolytic cleavage of the polymer chain caused by acidic species present in the polymer. The acidic species may be acidic catalyst residues derived from catalysts used in the formation of the polymer or may be acetic acid generated from acetate end groups when a given chain, so stabilized, depolymerizes as a result of occasional oxidative or acidolytic chain scission. To assist in minimizing such degradation of polyoxymethylene especially during subsequent processing in the hot, or melt, state, "acid seavengers" are often admixed with the polymer composition. Albeit most commercially available polyoxymethylene is "prestablized" either by means of acetylation or hydrolysis treatments (see, for example, U.S. Pat. No. 3,839,267) or by the addition of additives such as the above-mentioned antioxidants and/or acid scavengers, it has been found that during the high-temperature molding, particularly, injection molding of the non-fiber reinforced resin an objectionable film, or mold deposit, commonly forms on the surface of the mold. The mold deposit, which can lead to surface defects on the molded resin, is generally believed to be of two types. One type of mold deposit is believed to be caused by the use of certain antioxidants which plate out on the mold surface. This type of mold deposit can be eliminated by using a less volatile antioxidant. The second type of mold deposit is believed to be caused by formaldehyde (generated, for example, as a result of the chain scission of the polyoxymethylene under the conditions of the molding process) condensing on the mold surface. The chain scission, in turn, is believed to be caused by acidic residues present in the polyoxymethylene and which have not been "cleaned up" by the prior stabilization treatments.

Although the thermal stabilization, i.e., stabilization against the effects of temperatures encountered in the melt state, of polyoxymethylene has heretofore been proposed in the art such as, for example, by the addition to the polyoxymethylene of amino substituted amides (U.S. Pat. No. 3,274,149), carbamates (U.S. Pat. No. 3,144,431), or severely hindered carbodiimides (British Pat. No. 993,600), such stabilization has either not been effective in removing the mold deposit tendency or results in undesirable discoloration of the polymer.

The physical blending of polyoxymethylene with thermoplastic resins, so as to improve the properties of a polycarbonate has also been proposed. Such blending has not been directed at improving the properties of the polyoxymethylene and has employed a relatively large quantity of the polycarbonate. Thus, for example, Miller, U.S. Pat. No. 3,646,159, discloses the blending of polyoxymethylenes, or polyacetals with a polycarbonate to improve the properties of the polycarbonate and to provide a polycarbonate mixture having improved resistance to environmental stress cracking and crazing. Although Miller suggests, inter alia, that the polyacetals may be employed in amounts of from 25 to 95 percent by weight based on the combined weight of the polycarbonate and polyacetal, the working examples are limited to blends containing a maximum of about 50 percent by weight of polyacetal. Goldblum, U.S. Pat. No. 3,290,261, discloses the blending of polycarbonate and up to about 20 percent polyacetal to obtain a foamed polycarbonate resin. Goldblum discloses that if the amount of polyacetal exceeds 20 percent, then the blend begins to lose the beneficial properties of the polycarbonate (Column 1, line 47).

Polycarbonates have also been disclosed as additives or modifiers or scavengers for polyester tire cord when added to the polyester prior to fiber formation (see, for instance, Rye et al, U.S. Pat. No. 3,563,847).

In light of this prior art it is an object of the present invention to provide a process for the preparation of an improved polyoxymethylene molding composition which forms reduced mold deposits upon molding.

It is a further object of the invention to provide a polyoxymethylene molding composition having high stability when subjected to the influence of heat and particularly when subjected to the conditions typically encountered during molding operations.

It is still another object of the present invention to provide an improved non-reinforced polyoxymethylene composition for an injection molding process.

Another object of the present invention is the provision for the preparation of a stabilized polyoxymethylene molding composition employing an aromatic polycarbonate additive, which stabilized polyoxymethylene is not undesirably discolored.

These and other objects of the invention will become apparent from the following summary and description of preferred embodiments.

SUMMARY OF THE INVENTION

According to the present invention it has now been found that certain aromatic polycarbonates (as defined) increase the thermal stability of polyoxymethylenes without severely discoloring the polyoxymethylenes. The addition of the aromatic polycarbonate to polyoxymethylene followed by the appropriate thermal treatment has been found to reduce the amount of formaldehyde generated by the polyoxymethylene when subsequently subjected to the influence of heat; particularly when subjected to conditions which have heretofore resulted in the formation of objectionable formaldehyde-type mold deposits.

The improved molding composition, i.e., stabilized polyoxymethylene, is prepared by heating the polyoxymethylene and the polycarbonate while in admixture of at least about two minutes at a temperature at which the polyoxymethylene is molten (generally above 160° C.). The amount of polycarbonate used is from about 1 to about 4 percent by weight, based upon the weight of the polyoxymethylene polymer. Particularly satisfactory results are achieved if a minor quantity of malonamide also is admixed with the polyoxymethylene polymer and the aromatic polycarbonate during heating.

DESCRIPTION OF PREFERRED EMBODIMENTS

As used herein the term "polyoxymethylene" is intended to include both homopolymers, including so-called capped homopolymers, i.e., acylated homopolymers, as well as copolymers as will be defined more specifically below.

The thermal stability provided by the addition of the aromatic polycarbonates to the polyoxymethylene according to the present invention is stability against degradation when the polyoxymethylene is subjected to the influence of heat. The aromatic polycarbonate is believed to provide stability against any of the degradative effects of heat including, for example, aging of molded polyoxymethylene articles at temperatures of from 100 to 140° C., but is particularly useful in providing stability against degradation when the polyoxymethylene is subjected to the temperatures and conditions typically encountered during the molding of the polyoxymethylene into shaped articles, i.e., temperatures of from about 185° C. to about 240° C. for a period of several minutes.

A particularly preferred application of the present invention is in the injection molding of polyoxymethylene because the manifestations of the instability, or degradation, of polyoxymethylene are more troublesome in this type of operation than in, for example, an extrusion operation. In the extrusion of polyoxymethylene, formaldehyde which may be generated during degradation of the polymer does not have an opportunity to condense on a mold surface and may escape through vents provided on the extruder.

Injection molding is intended to refer to any of the well-known processes wherein a polyoxymethylene molding composition is heated in a preheating zone to a plastic melt, and is thereafter forced through a nozzle into a closed mold. Heating of the polyoxymethylene is typically to a temperature of from about 180° C. to about 240° C. The temperature of the mold is generally substantially lower, e.g., about 100° C. lower, although the exact relationship between the melt temperature and the mold temperature is dependent on factors such as the desired surface characteristics of the shaped article as will be appreciated by the art-skilled person. Mold deposit can be noticed at any of the recommended molding temperatures when a poor quality polyoxymethylene copolymer is employed (usually after 25-50 shots) and tends to be greater with higher melt temperatures and lower mold temperatures. The tendency toward mold deposit varies according to the particular polyoxymethylene, prestabilization treatment and the like. Thus for example, acylated homopolymer generally produces mold deposit problems less frequently than a melt hydrolyzed copolymer. The occurrence of the mold-deposit problems depends additionally on the size of the molded part, gating and venting. Small parts, small gates and inadequate venting give the most problems. The mold deposit tends to cause imperfections on the surface of the molded parts. Such parts must be ground up and remolded.

The addition of the polycarbonates to the polyoxymethylene according to the present invention is effective in providing thermal stabilization at the molding (melt) temperatures, but may not be effective above temperatures of about 249° C. because of the degradation of the polyoxymethylene.

The injection molding may be carried out in conventional injection-molding apparatus having, for example, a preheating cylinder, plunger, or reciprocating screw, torpedo, nozzle and mold including a sprue, runners, gates and mold cavities. Cylinder temperatures are usually between about 180° C. and about 240° C. and molding pressures are usually between about 5,000 and 20,000 psi. Actual molding temperatures and pressures will vary depending on the type of machine, i.e., plunger injection molding machine or screw injection molding machine, employed or on the desired shape and size of the molded article. Cycle times are usually between about 30 and about 110 seconds.

Polyoxymethylene polymer which may be stabilized with the aromatic polycarbonate in accordance with the present invention, as stated above, includes both homopolymers and copolymers. Such polymers, which may be produced according to methods well-known in the art have recurring -OCH$_2$- units and are typically prepared by the polymerization of anhydrous formaldehyde or by the polymerization of trioxane.

Particularly useful in this invention is polyoxymethylene copolymer having at least one chain containing recurring oxymethylene (—OCH$_2$—) units interspersed with —OR— groups in the main polymer chain where R is a divalent radical containing at least two carbon atoms directly linked to each other and positioned in the chain between the two valences with any substituents on said R radical being inert, i.e., substituents which will not induce undesirable reactions. Preferred copolymers contain from 60 to 99.6 mole percent of recurring oxymethylene groups. In a preferred embodiment R may be, for example, an alkylene or substituted alkylene group containing at least two carbon atoms.

Among the copolymers which are utilized in accordance with the invention are those having a structure comprising recurring units of the formula:

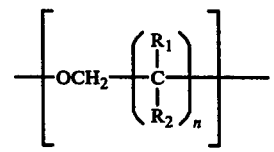

wherein n is zero or an integer of from 1 to 5 and wherein n is zero in from 60 to 99.6 percent of the recurring units. R$_1$ and R$_2$ are inert substituents, that is, substituents which will not cause undesirable reactions.

A preferred class of copolymers are those having a structure comprising recurring units wherein from 60 to 99.6 percent of the recurring units are oxymethylene units. These copolymers are prepared by copolymerizing trioxane with a cyclic ether having the structure:

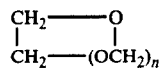

wherein n is 0, 1 or 2.

Examples of other preferred polymers include copolymers of trioxane and cyclic ethers containing at least two adjacent carbon atoms such as the copolymers disclosed in U.S. Pat. No. 3,027,352.

Among the specific ethers which may be used are ethylene oxide, 1,3-dioxolane, 1,3,5-trioxane, 1,3-dioxane, trimethylene oxide, pentamethylene oxide, 1,2-propylene oxide, 1,2-butylene oxide, neopentyl formal, pentaerythritol diformal paraldehyde, tetrahydrofuran, and butadiene monoxide.

The preferred polymers treated in accordance with the invention are moldable thermoplastic materials having a weight average molecular weight of at least about 35,000, a melting point of at least about 150° C. and an inherent viscosity of at least about 0.8 (measured at 60° C. in a 0.1 weight percent solution in p-chlorophenol containing 2 weight percent of alpha-pinene).

As understood by those skilled in the art, the polyoxymethylene should be pre-stabilized prior to being heated in admixture with the polycarbonate. Such pre-stabilization may take the form of stabilization by degradation of the molecular ends of the polymer chain to a point where a relatively stable carbon-to-carbon linkage exits at each end. For example, such degradation may be effected by melt hydrolysis such as that disclosed in U.S. Pat. No. 3,318,848 or by solution hydrolysis such as that disclosed in U.S. Pat. 3,219,623. Mixtures of polyoxymethylenes stabilized by melt hydrolysis and by solution hydrolysis may, of course, be used. The polyoxymethylene may also be pre-stabilized by admixing with conventional stabilizers such as an antioxidant (e.g. in a concentration of about 0.2 to 2.0 percent by weight) and/or an acid scavenger (e.g. in a concentration of about 0.05 to 1.0 percent by weight). Generally, these stabilizers will be present in a total amount of less than about 3 percent by weight based on the weight of the polyoxymethylene polymer.

Generally speaking, the aromatic polycarbonates that are employed according to the present invention are well known, commercially available thermoplastic resin materials. In general, such aromatic polycarbonates may be described as polymers containing recurring structural units of the formula:

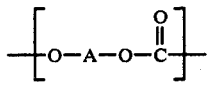

where A is a divalent aromatic radical derived from a non-hindered non-halogenated dihydric phenol. Specific processes for preparing such polycarbonates as well as starting materials and polymers prepared therefrom are described in well known tests such as "Chemistry and Physics of Polycarbonates" by Herman Schnell and "Polycarbonates" by Willian F. Christopher, and in the patent literature, such as U.S. Pat. Nos. 2,970,137; 2,991,273; 2,999,846; 2,999,835; 3,014,891; 3,028,365; 3,030,331, and the lke which are herein incorporated by reference.

The dihydric phenol is non-hindered in the sense no ortho substitution is present on the aromatic ring adjacent either of the hydroxy groups. Such substitution will prevent the resulting polycarbonates from effectively functioning in the process of the present invention. Para-substituted dihydric phenols are preferred; however, meta-substituted dihydric phenols are acceptable for use. Also, the dihydric phenol is free of halogens or any other functional groups including sulfone linkages which would interfere with the desired results. Preferably only hydrogens are present on the aromatic rings of the dihydric phenol other than the hydroxyl groups.

Representative non-hindered, non-halogenated dihydric phenols from which the aromatic polycarbonate can be derived include:

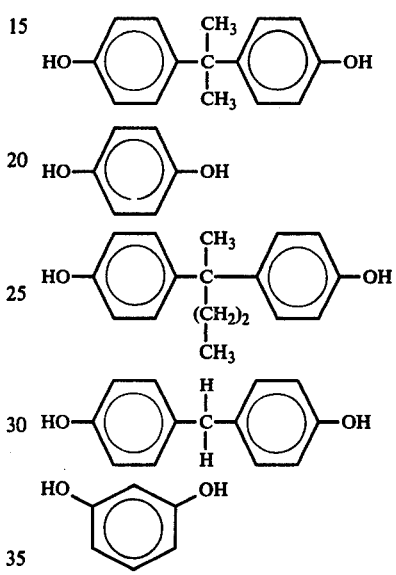

A hindered dihydric phenol such as 2,2'-dihydroxydiphenyl, i.e.,

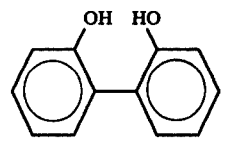

should not be employed.

For example, the preferred aromatic polycarbonate may be produced from a dihydroxydiaryl alkane such as 2,2-bis-(4-hydroxyphenyl)propane (i.e. bisphenol A) and phosgene, a haloformate or a diester of carbonic acid as described in U.S. Pat. No. 3,028,365. Homopolymers derived from 2,2-bis-(4-hydroxyphenyl) propane are particularly preferred. Such materials are marketed commercially under the trademark "Merlon" by the Mobay Chemical Corporation and "Lexan" by the General Electric Company. Preferred aromatic polycarbonate copolymers are derived from at least 80 mole percent of 2,2-bis-(4-hydroxyphenyl) propane.

The aromatic polycarbonate selected for use in the present process is miscible with the polyoxymethylene polymer while in the molten state so as to insure good mixing or blending, and additionally should not volatilize under the conditions of mixing and subsequent molding. Typically the aromatic polycarbonate has an intrinsic viscosity of about 0.35 to 0.75 in methylene chloride at 25° C., and preferably an intrinsic viscosity of about 0.35 to 0.6 under the same conditions.

The aromatic polycarbonate is mixed or blended with the polyoxymethylene composition (i.e. pre-stabilized polyoxymethylene) in an amount of from about 1 to about 4 percent by weight based on the weight of the polyoxymethylene polymer and more preferably in an amount of from about 1 to about 2 percent by weight. Amounts of aromatic polycarbonate much less than about 1 percent by weight may require extensive mixing with the polyoxymethylene to achieve a desired stabilization whereas amounts much greater than about 4 percent by weight tend to significantly adversely alter the physical properties, i.e., tensile strength, Izod impact values and the like, of a molded article formed from the composition. Any of the aromatic polycarbonates included within the description presented above can be used alone or in mixture with other of the aromatic polycarbonates to achieve the desired results.

The polyoxymethylene and polycarbonate are heated to a temperature at which the polyoxymethylene is molten or in the melt state. Generally, a temperature above about 160° C. is required, preferably above about 180° C., and more preferably between about 180° C. and about 240° C. Temperatures much higher than about 240° C. may lead to degradation of the materials and/or possible adverse side reactions. Thus, the temperature range is one which will maintain the polyoxymethylene polymer in melt form, but not cause significant degradation or adverse side reactions.

The polyoxymethylene polymer and aromatic polycarbonate are maintained at these temperatures for at least about 2 minutes and usually for about 2 to about 20 minutes. Caution should be employed when longer times are used particularly much above about 20 minutes as the polymer materials may tend to degrade.

The exact time employed will depend primarily on the particular apparatus in which the polymers are heated while in admixture. More efficient mixing and heating devices such as a Werner-Pfleiderer ZSK twin screw extruder will of course require less time than, for example, devices such as a Brabender plastograph.

In general, the polyoxymethylene and polycarbonate may be mixed or blended and heated in any convenient manner or apparatus as long as the polyoxymethylene polymer is molten and in intimate contact with the aromatic polycarbonate for at least about 2 minutes while in such a state. If desired the polymers can first be dry blended and thereafter heated or they can be initially admixed in the heating apparatus.

It is believed that the aromatic polycarbonate reacts with the acid residues in the polyoxymethylene polymer during the heating step, thus stabilizing the polyoxymethylene when it is subsequently molded, i.e., formaldehyde mold deposit is decreased. Accordingly, the most efficient means of heating and mixing the polymers are desirable to assure complete polycarbonate-acid residue reaction and hence substantial elimination of the formaldehyde mold deposit during subsequent molding.

For this reason direct addition of the polycarbonate to the polyoxymethylene in the molding apparatus is not recommended unless sufficient preheat time is provided for the materials to be mixed and for the aromatic polycarbonate-acid residue reaction to occur before the molding composition enters the mold cavity.

If desired, the polyoxymethylene and polycarbonate may be mixed and heated as set forth above, pelleted and stored for later use in the molding process.

Polyoxymethylene molding compositions of the present invention, in addition to including the polyoxymethylene and the polycarbonate, optionally may also include a minor quantity of additives conventionally employed in polyoxymethylene molding compositions both polymeric and non-polymeric, such as lubricity agents, dyes, and conventional antioxidants and acid scavengers, etc., as discussed above. In a preferred embodiment fibrous reinforcement is omitted from the molding composition since it is in such a system that mold deposit problems have more commonly been observed in the prior art.

The aromatic polycarbonates utilized in the present process are believed to be somewhat unique in that the mold deposit problem is effectively eliminated. Excessive color formation, as often encountered if large amounts of conventional basic acid scavengers are employed, is not a factor. Also, as discussed below there is no significant reduction in molded article properties as is commonly encountered if particulate non-polymeric additives are utilized.

In a particularly preferred aspect according to the present invention, the aromatic polycarbonate is employed in combination with a minor quantity of malonamide (i.e. carboamidoacetamide) to provide an effective thermal stabilization of polyoxymethylenes and, particularly, to reduce the mold deposit tendencies of the polyoxymethylene. Malonamide is a known and effective thermal stabilizer for polyoxymethylene polymer, but is not widely used because it adversely discolors the polyoxymethylenes and tends to be expensive. See, for instance, U.S. Pat. No. 3,116,267. In combination with the aromatic polycarbonate, however, the discoloration of the polyoxymethylene surprisingly is substantially reduce and at the same time the desired thermal stabilization is provided. The presence of the aromatic polycarbonate permits the utilization of lesser levels of malonamide. For instance, malonamide may be present in a concentration of about 0.1 to 1 percent by weight based on the weight of the polyoxymethylene polymer, and preferably in a concentration of about 0.1 to about 0.5 percent by weight.

Molded articles prepared from the aromatic polycarbonate-stabilized polyoxymethylene molding composition according to the present invention show only a slight decrease, typically less than 10 percent, in physical properties (tensile, modulus, impact strengths, and the like) as compared to articles prepared from polyoxymethylene compositions not including the aromatic polycarbonate.

As indicated hereinabove, the polyoxymethylene molding compositions of the present invention show increased thermal stability when heated to temperatures of from about 180° C. to about 240° C. The thermal stability can be measured by heating the polyoxymethylene composition in an all glass apparatus at a temperature of either 218° C. or 228° C. ± 2° C. for 30 minutes. At the end of this time a vacuum is applied to the system and the liberated formaldehyde is drawn through two sodium sulfite traps. The quantity of formaldehyde in the traps is then determined by titration with a standard acid. The amount of formaldehyde given off is a reasonable measure of the thermal stability and of the tendency of the composition to form mold deposits.

The invention thus provides a means for thermally stabilizing polyoxymethylene polymer in a short time while employing small concentrations of a particular class of aromatic polycarbonate or of aromatic polycarbonate in combination with malonamide.

The invention is additionally illustrated in connection with the following examples which are to be considered as illustrative of the present invention. It should be understood, however, that the invention is not limited to the specific details of the examples.

EXAMPLES

The thermal stability of various polyoxymethylene molding compositions in accordance with the present invention are shown in the Table.

The molding compositions were prepared by mixing 50 grams of the polyoxymethylene polymer with the additives in a Brabender Plasticorder plastigraph (200° C. and 35 RPM). Additives were blended in for twenty minutes from the time and polyoxymethylene polymer appeared to be completely melted. Controls were milled for similar times in the absence of any additives. No torque increases were observed for any of the blends.

Polymers I and II were each polyoxymethylene copolymers prepared in the same manner from trioxane and ethylene oxide (2 percent by weight). Each had a weight average molecular weight of 68,000. Polymer I had been melt hydrolyzed according to the technique of U.S. Pat. No. 3,219,623. Each of the polymers also had been "stabilized" or "pre-stabilized" prior to compounding with the polycarbonate with a standard additive package including 0.5 percent 2,2'-methylene-bis-(4-methyl-6-tertiary butyl phenol) antioxidant, 0.1 percent cyanoguanidine acid scavenger, and about 0.2 percent diamide synthetic wax lubricant available from Glyco Chemicals, Inc. under the designation Acrawax C lubricant.

Aromatic polycarbonate I was non-hindered and non-halogenated and was commercially available under the trademark "Merlon", type M39F, from the Mobay Chemical Company. It was derived from 2,2-bis(4-hydroxyphenyl) propane and exhibited an intrinsic viscosity in methylene chloride at 25° C. of 0.5.

Generated formaldehyde was determined according to the procedure described above by heating the samples at 228° C. for 30 minutes, and is based on the initial weight of the sample.

TABLE

| Ex. No. | Molding Composition | Percent Generated Formaldehyde | Color of Molded Article |
|---|---|---|---|
| 1 | Polymer I Control | 0.28 | white |
| 2 | Polymer II Control | 0.10 | white |
| 3 | Polymer I + 1% malonamide | 0.02 | pale yellow |
| 4 | Polymer I + 1% Polycarbonate I | 0.12 | white |
| 5 | Polymer I + 1% malonamide + 1% Polycarbonate I | <0.01 | slightly off-white |

It is readily seen that an aromatic polycarbonate defined according to this invention provides effective stabilization against degradation of the polyoxymethylene under the test conditions and without imparting objectionable discoloration to the polyoxymethylene.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A process for producing an improved polyoxymethylene molding composition comprising heating a mixture of:
   (1) a polyoxymethylene polymer which exhibits a propensity to form mold deposits upon molding, and
   (2) about 1 to about 4 percent by weight based on the weight of the polyoxymethylene polymer of an aromatic polycarbonate having an intrinsic viscosity of about 0.35 to 0.75 in methylene chloride at 25° C. which is derived from a non-hindered non-halogenated dihydric phenol, for at least about 2 minutes at a temperature at which the polyoxymethylene polymer is molten to yield a molding composition which forms a reduced quantity of mold deposits upon molding.

2. The process for producing an improved polyoxymethylene molding composition of claim 1 wherein the mixture is heated at a temperature above about 160° C.

3. The process for producing an improved polyoxymethylene molding composition of claim 1 wherein the polymer mixture is heated at a temperature between about 180° C. and about 240° C. for a time period of from about 2 to about 20 minutes.

4. The process for producing an improved polyoxymethylene molding composition of claim 1 wherein the polyoxymethylene polymer has an inherent viscosity of at least 0.8 (measured at 60° C. in a 0.1 weight percent solution in p-chlorophenol containing 2 weight percent of alpha-pinene), a weight average molecular weight of at least 35,000, and a melting point of at least 150° C.

5. The process for producing an improved polyoxymethylene molding composition of claim 4 wherein the polyoxymethylene polymer is a copolymer comprising about 60 to about 99.6 percent recurring —$OCH_2$— groups.

6. The process for producing an improved polyoxymethylene molding composition of claim 5 wherein the polyoxymethylene polymer has been pre-stabilized by melt hydrolysis prior to mixture with component (2).

7. The process for producing an improved polyoxymethylene molding composition of claim 5 wherein the polyoxymethylene polymer is a mixture of melt hydrolyzed and solution hydrolyzed polymer prior to mixture with component (2).

8. The process for producing an improved polyoxymethylene molding composition of claim 5 wherein the polyoxymethylene polymer has been pre-stabilized by the addition of an antioxidant and an acid scavenger prior to heating.

9. The process for producing an improved polyoxymethylene molding composition of claim 1 wherein the aromatic polycarbonate has an intrinsic viscosity of about 0.35 to 0.6 in methylene chloride at 25° C.

10. The process for producing an improved polyoxymethylene molding composition of claim 1 wherein the dihydric phenol from which the aromatic polycarbonate is derived is 2,2-bis(4-hydroxyphenyl)propane.

11. The process for producing an improved polyoxymethylene molding composition of claim 1 wherein a minor quantity of malonamide is admixed with components (1) and (2) during said heating.

12. The process for producing an improved polyoxymethylene molding composition of claim 1 wherein the resulting molding composition is free of fibrous reinforcement.

13. A process for producing an improved polyoxymethylene, molding composition which is free of fibrous reinforcement comprising heating a mixture of:
   (1) a polyoxymethylene polymer which exhibits a propensity to form mold deposits upon molding,
   (2) about 1 to about 2 percent by weight based on the weight of the polyoxymethylene polymer of an aromatic polycarbonate having an intrinsic viscosity of about 0.35 to 0.75 in methylene chloride at 25° C. which is derived from a non-hindered non-halogenated dihydric phenol, and
   (3) about 0.1 to about 1 percent by weight based on the weight of the polyoxymethylene polymer of malonamide, at a temperature between about 180° C. and about 240° C. for a time period of from about 2 to about 20 minutes to yield an improved molding composition which forms a reduced quantity of mold deposits upon molding.

14. The process for producing an improved polyoxymethylene molding composition of claim 13 wherein the polyoxymethylene polymer has an inherent viscosity of at least 0.8 (measured at 60° C. in a 0.1 weight percent solution in p-chlorophenol containing 2 weight percent of alpha-pinene), a weight average molecular weight of at least 35,000, and a melting point of at least 150° C.

15. The process for producing an improved polyoxymethylene molding composition of claim 13 wherein the polyoxymethylene polymer is a copolymer comprising about 60 to about 99.6 percent recurring —OCH$_2$— groups.

16. The process for producing an improved polyoxymethylene molding composition of claim 15 wherein the polyoxymethylene polymer has been pre-stabilized by melt hydrolysis prior to mixture with component (2).

17. The process for producing an improved polyoxymethylene molding composition of claim 15 wherein the polyoxymethylene polymer is a mixture of melt hydrolyzed and solution hydrolyzed polymer prior to mixture with components (2) and (3).

18. The process for producing an improved polyoxymethylene molding composition of claim 15 wherein said polyoxymethylene polymer is pre-stabilized by the addition of an antioxidant and an acid scavenger prior to heating.

19. The process for producing an improved polyoxymethylene molding composition of claim 18 wherein said antioxidant is 2,2'-methylene -bis-(4-methyl-6-tertiary butyl phenol) and said acid scavenger is cyanoguanidine.

20. The process for producing an improved polyoxymethylene molding composition of claim 13 wherein the aromatic polycarbonate has an intrinsic viscosity of about 0.35 to 0.6 in methylene chloride at 25° C.

21. The process for producing an improved polyoxymethylene molding composition of claim 13 wherein the dihydric phenol from which the aromatic polycarbonate is derived is 2,2-bis(4-hydroxyphenyl)propane.

22. The process for producing an improved polyoxymethylene molding composition of claim 13 wherein component (3) is present in a concentration of about 0.1 to about 0.5 percent by weight based upon the weight of the oxymethylene polymer.

23. The process for producing an improved polyoxymethylene molding composition of claim 1 which includes the additional step of injection molding the resulting improved polyoxymethylene molding composition.

24. The improved polyoxymethylene molding composition which is produced by the process of claim 1.

25. The improved polyoxymethylene molding composition which is produced by the process of claim 13.

* * * * *